Figure 1:
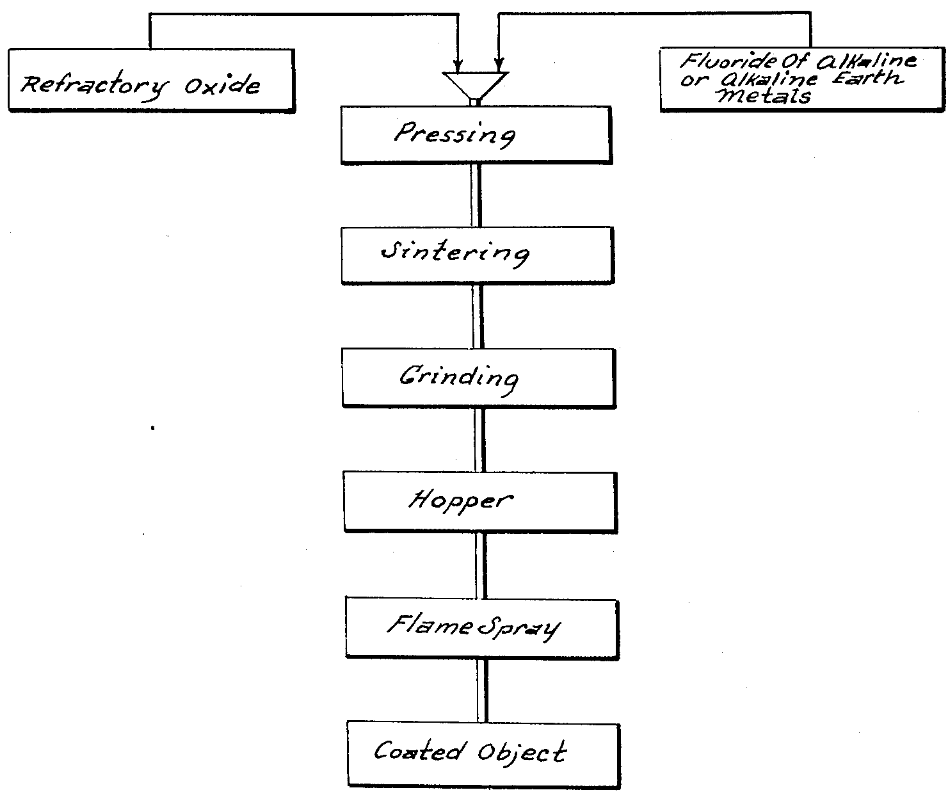

Feb. 18, 1964 M. EISENBERG 3,121,643

FLAME SPRAYING OF OXIDATION-RESISTANT, ADHERENT COATINGS

Filed March 23, 1955

INVENTOR.
Marvin Eisenberg
BY:
S. J. Rotondi & A. J. Dupont

United States Patent Office 3,121,643 Patented Feb. 18, 1964

3,121,643

FLAME SPRAYING OF OXIDATION-RESISTANT, ADHERENT COATINGS

Marvin Eisenberg, Chicago, Ill., assignor, by mesne assignments, to the United States of America as represented by the Secretary of the Army Filed Mar. 23, 1955, Ser. No. 496,330
12 Claims. (Cl. 117—105.2)

The present invention is directed to a method of supplying oxidation-resistant, adherent coatings of ceramic materials and to the coatings thus produced. The present invention has particular applicability to coating of various base materials, including metals and glass for the purpose of increasing the resistance of the base materials to elevated temperatures, oxidative conditions, reducing their thermal conductivities or their electrical conductivities, and for various other purposes.

One of the principal fields of application of the present invention is the coating of metal surfaces to increase the oxidation resistance of the metal or to increase its resistance to attack by acids or products of combustion. Typical of the latter use is the coating of metal objects used in internal combustion engines to avoid the highly corrosive effects of the lead oxide produced by the combustion of gasoline containing tetraethyl lead.

Prior attempts to bond glass-type ceramic materials to metal surfaces, for example, have not always been successful because of the difficulty in securing adhesion between the two dissimilar materials. Even if the adhesion were sufficient, further difficulties arose because of the brittle nature of the glass type coating which resulted on the article.

Accordingly, an object of the present invention is to provide a method for applying thermally resistant, adherent coatings of ceramic materials to bases of various descriptions.

Another object of the present invention is to provide a method for applying thin, adherent oxidation-resistant coatings in a convenient and efficient manner.

A still further object of the invention is to provide an improved type of coating materials, including refractory ceramic particles capable of being bonded to various base materials.

Another object of the invention is to provide improved refractory, oxidation-resistant, electrically non-conductive coatings.

These and other objects of the invention are achieved by a process of flame spraying in which a high temperature flame is directed at the object to be coated, and the ceramic composition is injected into the flame as the flame is applied to the object. More particularly, it has been found that remarkably improved coatings result when the material injected into the flame is a mixture of a refractory oxide and a fluoride of an alkali metal or an alkaline earth metal. For the purposes of this specification and claims, magnesium is included within the alkaline earth metal group.

The coatings of the present invention are markedly superior to those produced by applying various glass compositions, even with the flame spraying method, onto the base. Apparently, the difference in atomic structure between the coatings produced according to this invention and those produced by spraying fused glass onto the same objects accounts for this wide variation in properties. As is well known, glass compositions are amorphous in structure while it has been determined that the atomic structure of the coatings of the invention, as evidenced by X-ray diffraction data, are crystalline. It is believed that the flame spraying operation when carried out according to the present invention results in an in situ formation of a reaction product between the refractory oxide and the fluoride. Apparently, the fluoride replaces at least some of the oxygen atoms in the crystalline lattice of the oxide to produce an oxyfluoride.

The coatings produced according to the present invention are, for the most part, highly refractory and adherent. Most of the compositions tested cannot be melted with an oxyacetylene torch, and can be quenched in cold water from red heat without injury. Miscroscopic examination of the coating in a thin section reveals a fine grained, dense structure. This type of coating offers unusually good resistance to various types of corrosion, including that caused by molten metals and salts, and products of combustion.

In general, as the oxide content of the coating increases, the thermal shock resistance and the insulation properties are also increased. The addition of the fluoride, and the formation of the oxyfluoride, appears to increase substantially by the bonding ability of the oxide coating without significantly affecting its refractory properties.

The relative proportions between the oxide and the fluoride will vary considerably, depending upon the particular system employed. In some systems, the fluoride may be present in very minor amounts such as about 1% of the refractory composition. In other cases, the fluoride content may be as high as 25%, or even higher. Generally, however, the fluoride will constitute about 2 to 20% of the composition with the balance being the oxide. To a large extent, the percentage of the fluoride to be added will depend upon the properties desired in the ultimate coating, i.e., whether refractoriness is more important than bonding ability.

Two of the systems which provide the best overall coatings are the combination of alumina and magnesium fluoride, and the system consisting of zirconia and calcium fluoride.

The best aluminum oxide flame sprayed coatings have been prepared from the gamma type aluminum oxide rather than from the alpha type. While coatings including the gamma type aluminum oxide do not appear to be well adapted for continuous service at extremely high temperatures, they do have excellent heat protection properties at temperatures below about 1000° C.

The alumina-magnesium fluoride system produces coatings which are harder and more adherent than those produced with other fluoride binders. Apparently, this is due to the fact that alumina and magnesium fluoride have the same type of crystal structure and are more compatible than combinations of aluminum oxide and other fluorides. Additional work along these lines has established that, as a general rule, the best coatings are produced from a combination of refractory oxide and fluoride which have the same type of crystal structure.

Another system which provides particularly good coatings is the combination of zirconia and calcium fluoride. In contrast to the alumina-magnesium fluoride type coatings, the zirconia coatings containing about 2 to 5% of calcium fluoride have been found to be eminently suitable for continuous high temperature service.

In addition to the foregoing, the following systems have been found to produce satisfactory flame sprayed ceramic coatings:

*Table I*

$TiO_2$—$MgF_2$
$MgO$—$LiF$
$Al_2O_3$, $MgO$—$MgF_2$, $LiF$
$Al_2O_3$—$MgF_2$, $CaF_2$
$Al_2O_3$, $Na_2SiO_3$—$NaBF_4$
$MgO$—$MgF_2$
$CaO$—$KF$
$ZrO_2$—$LiF$
$ThO_2$—$CaF_2$
$UO_2$—$CaF_2$
$CeO_2$—$CaF_2$
$PrO_2$—$CaF_2$

In connection with the foregoing, it is not essential that the starting material be an oxide itself, but only that the compound employed be decomposed under the conditions of flame spraying to produce the oxide. For example, magnesium carbonate can be employed as a suitable source of magnesium oxide. In addition, alumina hydrate is the preferred starting material for alumina base coatings, since under the conditions of deposition, the gamma type alumina results.

The equipment used to apply the flame sprayed coating may take any of a variety of forms. Most simply, an oxyacetylene cutting torch can be modified by the inclusion of a venturi nozzle to permit injection of the finely divided particulated mixture of the oxide and the fluoride into the flame while the flame is directed at the object to be coated.

Figure 2:
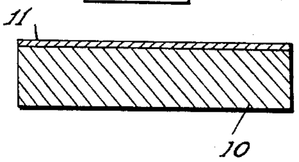

In the drawing,

FIGURE 1 is a flow sheet showing the various stages through which the coating material is passed, and FIGURE 2 is a cross-section of any object showing the coating layer thereon.

Referring to the flow sheet in FIGURE 1, which shows that the coating material is successively mixed, compressed, sintered, pulverized and fed into the hopper. From the hopper the powdered mixture is picked up by the stream of oxygen and fed to the spray gun where it is mixed with a fuel of hydrogen or other gas to form the flame spray carrying the powdered mixture for the desired coating.

FIGURE 2 is representative of an article 10 having a coating 11 that has been sprayed on by the method herein disclosed.

Better results are secured in the process of the present invention if the powdered mixture fed into the flame is homogeneous, and has a particle size less than about 100 mesh. Substantial increases in spraying efficiency of the coatings can be achieved by pre-sintering the mixture prior to its injection into the flame. In this technique, the mixed powders are pressed into pills or bars, and the compacts which result are heated to temperatures in the neighborhood of the melting point of the fluoride. At this temperature, some reaction may take place between the oxide and the fluoride to produce the oxyfluoride. The sintered product is then ground into powder having a particle size less than about 100 mesh for injection into the flame spraying apparatus. When the material is pre-sintered, it has been found to produce coatings which are superior to simple mixtures of the powders not only in their mechanical properties, but also in respect to porosity and corrosion resistance.

The porosity of the coatings produced can be reduced by including a powdered metal such as aluminum in the flame spraying composition. Generally, from about 2% to about 30% of the metal will be effective to seal up the pores of the coating at the operating conditions of the spraying apparatus.

The process of the present invention has been successfully practiced on a wide variety of base materials. For example, refractory, adherent coatings have been applied on materials such as steel, cast iron, various corrosion-resistant alloys, copper, aluminum, molybdenum, and heat-resistant "Pyrex" glass. The coatings of the present invention are particularly useful in coating molybdenum, which has excellent hot strength properties but which disintegrates rapidly by oxidation at temperatures far below the melting point of the metal.

The thickness of the coating applied will vary over wide limits, depending upon the use to which the coated article is to be put and the characteristics of the coating but in general, satisfactory coatings have been achieved with thickness in the range measuring from one micron to 0.050 inch.

The coatings of the present invention exhibit rather wide variations in properties, making them suitable for numerous applications. For example, various physical tests were made on a coating containing 3% magnesium fluoride and the balance alumina hydrate. The particle mixture had an average particle size of about 200 mesh. The coating was prepared by injecting the particulated mixture in an oxygen stream, mixing the stream with acetylene or hydrogen, and then burning the stream. The flame temperature was in the range from an estimated 1700° C. to about 3500° C. The nozzle of the flame spraying apparatus was held at distance varying from 1 to 6 inches from the object to be coated.

It was found in the case of the alumina base coatings that thicknesses up to 50 mils and beyond could be applied with ease. An X-ray analysis of the coating showed it to have the gamma type alumina structure. The hardness of the coating was found to be about the same as that of topaz or emerald. The coating had excellent scratch resistance, as it could not be scratched with a hardened steel needle. The same test when applied to alumina coatings containing no magnesium fluoride resulted in severe scratching of the coating.

The reflectivity of the coating was excellent, being comparable to a high quality titania porcelain enamel. At the same time, the reflected light was diffused so that the coating exhibited only a low gloss.

Another alumina-magnesium fluoride composition containing up to 20% magnesium fluoride was found to be unwetted by molten aluminum, and it was found that when aluminum metal was coated with this type of coating, the underlying metal could be melted away and the coating would float on the surface of the molten aluminum without being affected by the molten metal.

The same resistance to wetting by molten metals is exhibited by zirconia base fluoride compositions. In this connection, however, it should be noted that it is more difficult to build up thick deposits of the zirconia-fluoride coating than it is the alumina-fluoride type coating.

However, even in thicknesses of about 10 mils, the zirconia-fluoride coatings exhibit excellent resistance to corrosion and high temperatures.

The zirconia coating, upon X-ray analysis, has been found to be a stabilized isometric form rather than the relatively unstable mono-clinic form.

In another test, a composition was made up containing 10% calcium fluoride, 10% aluminum powder, and the balance zirconia. A steel rod was flame sprayed with this composition, and then held in a furnace at a temperature of 800° C. for 24 hours. At the end of this time, only a thin oxide film could be discovered, of a thickness insufficient to measure. In contrast, a control rod without the protective coating held in the furnace under the same conditions evidenced a very substantial oxidation.

The coatings of the present invention also have excellent flame resistance. The alumina-magnesium fluoride coating previously described and the calcium fluoride-zirconia coatings all melt at temperatures above the melting point of mild steel. Hence, because of their flame resistance, they have been found to afford good protection to steel even under the extreme conditions of operation which occur in rocket nozzles.

One of the distinct advantages obtained in using the coatings of the present invention arises from the fact that the object to be coated can be at practically any temperature and still receive a good coating, whereas in the past, with other coating techniques, the object frequently had to be preheated.

Despite the fact that the flame temperatures employed in the coating process may be very high, the coating deposited on the base goes through a tremendous temperature gradient before deposition, and hence can be employed on temperature sensitive materials. For example, a Pyrex tube filled with water can be effectively coated with coatings of the present invention without cracking the tubing and without boiling the water.

In preparing articles for the reception of the coatings, it is advisable to roughen the surface to achieve the best results. However, the bonding which occurs to the article is not completely a mechanical bonding. There is also definite evidence of molecular bonding between the flame sprayed coatings and the underlying base material. This is a distinct advantage because it is not absolutely essential that the coefficients of thermal expansion of the coating and the base material be identical. The existence of a molecular bonding is indicated, for example, by the fact that the coatings cannot be flaked off without damaging the base metal itself. Even when the coated article is subjected to excessive stresses so that failure occurs, the failure occurs in the coating itself rather than at the interface, so that the surface of the metal remains protected at all times.

As indicated, the best results are obtained when employing a mixture of the fluoride and the oxide. However, coatings suitable for some applications can be prepared from magnesium fluoride alone. This compound appears to be unique in the fact that it is apparently oxidized to form the oxifluoride under the conditions of flame spraying. The coatings which result while not as effective as the preferred oxide-fluoride combinations are, nevertheless, suitable for some low temperature adaptations.

From the foregoing, it will be appreciated that the coating compositions of the present invention have unique properties which adapt them to a wide variety of uses. It will also be apparent that numerous modifications can be made to the described embodiments without departing from the scope of the present invention.

I claim as my invention:

1. The method of coating an object with an adherent, oxidation-resistant coating which comprises directing a high temperature flame at said object, and injecting into one of the gas streams entering said flame a solid particulated mixture consisting essentially of a refractory oxide and a fluoride of a metal selected from the group consisting of the alkali metals and the alkaline earth metals, and depositing on said object a crystalline mixture of the two ingredients.

2. The method of coating an object with an oxidation-resistant adherent coating which comprises directing a high temperature flame at said object and injecting into one of the gas streams entering said flame a solid particulated mixture consisting essentially of alumina hydrate and a fluoride of a metal selected from the group consisting of the alkali metals and the alkaline earth metals, and depositing on said object a crystalline mixture of the two ingredients.

3. The method of coating an object with an oxidation-resistant adherent coating which comprises directing a high temperature flame at said object and injecting into one of the gas streams entering said flame a solid particulated mixture consisting essentially of zirconia and a fluoride of a metal selected from the group consisting of the alkali metals and the alkaline earth metals, and depositing on said object a crystalline mixture of the two ingredients.

4. The method of coating an object with an oxidation-resistant, adherent coating which comprises flame spraying onto said surface a crystalline reaction product consisting essentially of a refractory oxide and a fluoride of a metal selected from the group consisting of the alkali metals and the alkaline earth metals, and depositing on said object a crystalline mixture of the two ingredients.

5. The method of coating an object with an oxidation-resistant adherent coating which comprises directing a high temperature flame at said object and injecting into one of the gas streams entering said flame a particulated mixture consisting essentially of a refractory oxide and a fluoride of a metal selected from the group consisting of the alkali metals and the alkaline earth metals, said mixture having a particle size of less than 100 mesh, and depositing on said object a crystalline mixture of the two ingredients.

6. The method of coating an object with an oxidation-resistant, adherent coating which comprises directing a high temperature flame at said object and injecting into one of the gas streams entering said flame a particulated mixture consisting essentially of alumina and magnesium fluoride, and depositing on said object a crystalline mixture of the two ingredients.

7. The method of coating an object with an oxidation-resistant, adherent coating which comprises directing a high temperature flame at said object and injecting into one of the gas streams entering said flame a particulated mixture consisting essentially of zirconia and calcium fluoride, and depositing on said object a crystalline mixture of the two ingredients.

8. The method of coating an object with an adherent, oxidation-resistant coating which comprises pressing a mixture consisting essentially of a refractory oxide and a fluoride of a metal selected from the group consisting of the alkali metals and the alkaline earth metals into a compact, sintering said compact, grinding the sintered compact into a powder having a particle size less than 100 mesh, thereafter dispersing said powder into one of the gas streams entering a high temperature flame, and directing said flame at said object, and depositing on said object a crystalline mixture of the two ingredients.

9. An oxidation-resistant body comprising a base material coated with a material consisting essentially of a crystalline reaction product of a refractory oxide and a fluoride of a metal selected from the group consisting of the alkali metals and the alkaline earth metals.

10. An oxidation-resistant body comprising a base material coated with a material consisting essentially of a crystalline reaction product of a refractory oxide and a fluoride of a metal selected from the group consisting of the alkali metals and the alkaline earth metals, said coating having a thickness of from 1 micron to 0.050 inch.

11. An oxidation-resistant body comprising a base material coated with a material consisting essentially of a crystalline reaction product of alumina and magnesium fluoride.

12. An oxidation-resistant body comprising a base material coated with a material consisting essentially of a crystalline reaction product of zirconia and calcium fluoride.

References Cited in the file of this patent

UNITED STATES PATENTS

| | | |
|---|---|---|
| Re. 22,011 | Kinzie | Jan. 20, 1942 |
| 1,268,030 | McCoy | May 28, 1918 |
| 1,833,087 | Migeot | Nov. 24, 1931 |
| 2,137,442 | Callan | Nov. 22, 1938 |
| 2,220,742 | Thorson | Nov. 5, 1940 |
| 2,331,232 | Ross | Oct. 5, 1943 |
| 2,475,469 | Bennett et al. | July 5, 1949 |
| 2,480,473 | Johnson | Aug. 30, 1949 |
| 2,707,691 | Wheildon | May 3, 1955 |
| 2,711,975 | Kempe | June 28, 1955 |
| 2,775,531 | Montgomery | Dec. 25, 1956 |
| 2,843,507 | Long | July 15, 1958 |